(12) United States Patent
Kim

(10) Patent No.: US 8,254,007 B2
(45) Date of Patent: Aug. 28, 2012

(54) SCANNER AND IMAGE FORMING APPARATUS INCLUDING THE SAME

(75) Inventor: Se-Tae Kim, Seoul (KR)

(73) Assignee: Samsung Electroncis Co., Ltd., Suwon-si (KR)

( * ) Notice: Subject to any disclaimer, the term of this patent is extended or adjusted under 35 U.S.C. 154(b) by 305 days.

(21) Appl. No.: 12/567,179

(22) Filed: Sep. 25, 2009

(65) Prior Publication Data

US 2010/0142020 A1 Jun. 10, 2010

(30) Foreign Application Priority Data

Dec. 4, 2008 (KR) ........................ 10-2008-0122391

(51) Int. Cl.
*G02B 26/08* (2006.01)

(52) U.S. Cl. .................................................. 359/224.2
(58) Field of Classification Search ............... 359/200.6, 359/212.2, 223.1–226.1, 871, 872
See application file for complete search history.

(56) References Cited

U.S. PATENT DOCUMENTS 6,629,461 B2 * 10/2003 Behin et al. .................. 310/309

* cited by examiner

*Primary Examiner* — Euncha Cherry
(74) *Attorney, Agent, or Firm* — Staas & Halsey LLP

(57) ABSTRACT

Disclosed are a scanner and an image forming apparatus employing the same. The scanner may produce bidirectional scanning of light by oscillating a deflecting mirror about a first axis substantially parallel to the mirror surface, and may compensate for skewing of the scan lines by rotating the mirror about a second axis that is substantially perpendicular to the first axis so as to allow the light to be scanned at an angle.

24 Claims, 11 Drawing Sheets

SCANNER AND IMAGE FORMING APPARATUS INCLUDING THE SAME

CROSS-REFERENCE TO RELATED PATENT APPLICATION

This application claims the benefit of Korean Patent Application No. 10-2008-0122391, filed on Dec. 4, 2008, in the Korean Intellectual Property Office, the disclosure of which is incorporated herein by reference in its entirety.

TECHNICAL FIELD

The present disclosure relates generally to a scanner and an image forming apparatus including the same.

BACKGROUND OF RELATED ART

Beam scanning techniques for scanning a light beam emitted from a light source on a certain region of an object to be scanned may be applied in various devices such as, for example, image forming apparatuses and display devices. Beam scanning techniques may be important in improving the image quality of image forming apparatuses or displays, for example. A beam scanning unit of an image forming apparatus may include a polygon mirror that is rotationally driven by a spindle motor. The use of a spindle motor, however, may cause vibration, noise, and other problems. Moreover, when a polygon mirror is used, only a unidirectional scanning is possible and the scanning speed is not optimal.

Thus, a scanning apparatus of a configuration that improves the speed of the beam scanning and that reduces noise over the legacy apparatuses that require a spindle motor and a polygon mirror is desired.

SUMMARY OF THE DISCLOSURE

According to an aspect of the present disclosure, there is provided a scanner that may include a mirror having a reflective surface, a rotational body, a first bar and a driving unit. The rotational body may be arranged to be spaced apart from and to surround the mirror, and may be configured to rotate about a rotational axis substantially perpendicular to the reflective surface of the mirror. The first bar may connect the mirror to the rotational body such that the mirror rotates together with the rotational body about the rotational axis. The driving unit may be configured to drive the rotational body to rotate about the rotational axis.

The driving unit may be configured to produce an electrostatic force that cause the rotational body to rotate.

The driving unit may be configured to rotate the rotational body by a first rotational angle in a first direction from an initial reference position prior to initiating a forward scanning by the scanner.

The driving unit may be configured to rotate the rotational body in a second direction opposite to the first direction such that the rotational body is rotated from the initial reference position by a negative of the first rotational angle prior to initiating a backward scanning by the scanner.

The driving unit may be configured to drive the rotational body to rotate bidirectionally in a reciprocating manner within a range of rotational angles.

The first bar may be a torsion bar.

The scanner may further comprise one or more supporting members fixedly disposed to be spaced apart from the rotational body and one or more second bars connecting the rotational body and the supporting unit.

Each of the one or more second bars may be bendable.

The driving unit may comprise a comb driver.

The driving unit may comprise a comb electrode extending from the rotational body, a first group of electrode fingers extending from a first side of the comb electrode and a second group of electrode fingers extending from a second side opposite the first side of the comb electrode.

The scanner may further comprise a detector configured to detect a rotation angle of the rotational body.

The detector may comprise a comb electrode extending from the rotational body, a first group of electrode fingers extending from a first side of the comb electrode and a second group of electrode fingers extending from a second side opposite the first side of the comb electrode.

The mirror may be configured to vibrate about the first bar in synchronization with the rotation of the member.

The scanner may further comprise a magnet disposed on a surface opposite the reflective surface of the mirror, a yoke disposed adjacent the magnet, the yoke including a first portion and a second portion collectively configured to magnetically interact with the magnet and a coil wound around the yoke.

According to another aspect of the present disclosure, an image forming apparatus may be provided to include a light source configured to produce a light beam, a scanner, a photosensitive medium, a developing unit and a transfer unit. The scanner may be configured to receive the light beam from the light source and to deflect the received light beam across a scanning line. The photosensitive medium may include a photosensitive surface upon which the light beam deflected by the scanner is incident to thereby form on the photosensitive surface an electrostatic latent image. The developing unit may be arranged adjacent the photosensitive member, and may be configured to apply developing agent to the photosensitive surface so as to develop the electrostatic latent image into a visible image. The transfer unit may be configured to transfer the visible image onto a printing medium. The scanner may comprise a mirror having a reflective surface, a rotational body, a first bar and a driving unit. The rotational body may be arranged to be spaced apart from and to surround the mirror, and may be configured to rotate about a rotational axis substantially perpendicular to the reflective surface of the mirror. The first bar may connect the mirror to the rotational body such that the mirror rotates together with the rotational body about the rotational axis. The driving unit may be configured to drive the rotational body to rotate about the rotational axis.

The image forming apparatus may further comprise an optical device that may be configured to image the light beam scanned by the scanner onto the photosensitive medium.

The optical device may be configured to perform an arcsinusoidal correction on the light beam scanned by the scanner so that the light beam is scanned at regular intervals on the photosensitive surface of the photosensitive medium.

According to yet another aspect, a light scanning apparatus may be provided to include a light source configured to generate light and a mirror. The mirror may include a reflective surface upon which the light generated by the light source is incident. The mirror may be configured to oscillate about a first axis substantially parallel to the reflective surface, and may further be configured to be rotatable about a second axis substantially perpendicular to the first axis.

The light scanning apparatus may further comprise a rotational body, a bar member and a comb electrode structure. The rotational body may be arranged to be spaced apart from and to surround the mirror, and may be configured to rotate about the second axis. The bar member may extend substantially parallel to the first axis, and may connect the mirror to the rotational body such that the mirror rotates together with the rotational body about the second axis. The comb electrode structure may include one or more first electrode fingers coupled to the rotational body and one or more second electrode fingers in interdigitated arrangement with respect to the one or more first electrode fingers such that when a driving voltage is applied between the one or more first electrode fingers and the one or more second electrode fingers, an electromagnetic force acting between the one or more first electrode fingers and the one or more second electrode fingers causes the rotational body to rotate.

The light scanning apparatus may further comprise a magnet coupled to the mirror and a magnetic flux device arranged adjacent the magnet. The magnetic flux device may be configured to generate magnetic force in switching polarity such that the magnetic force acting upon the magnet causes the mirror to oscillate about the first axis.

The mirror may oscillate about the first axis so as to cause the light incident upon the reflective surface thereof to be deflected across a substantially linear scanned path. A first scanned path of the light deflected by the mirror when the mirror is rotated about the second axis to a first rotational position may form an angle with a second scanned path of the light deflected by the mirror when the mirror is rotated about the second axis to a second rotational position different from the first rotational position.

The light scanning apparatus may be configured to sequentially perform a first rotation of the mirror about the second axis in a first rotational direction, an oscillation of the mirror about the first axis and a second rotation of the mirror about the second axis in a second rotational direction opposite to the first rotational direction.

The light scanning apparatus may further comprise a rotational angle detector, which may include one or more third electrode fingers coupled to the rotational body and one or more fourth electrode fingers in interdigitated arrangement with respect to the one or more third electrode fingers such that when a detection voltage is applied between the one or more third electrode fingers and the one or more fourth electrode fingers, an electrostatic capacitance between the one or more third electrode fingers and the one or more fourth electrode fingers varies according to a distance by which the one or more third electrode fingers are spaced apart from the one or more fourth electrode fingers. The driving voltage and the detection voltage may be applied independently of each other.

BRIEF DESCRIPTION OF THE DRAWINGS

Various features and advantages of the present disclosure will become more apparent by describing in detail several embodiments thereof with reference to the attached drawings, in which.

DETAILED DESCRIPTION OF SEVERAL EMBODIMENTS

Figure 1:
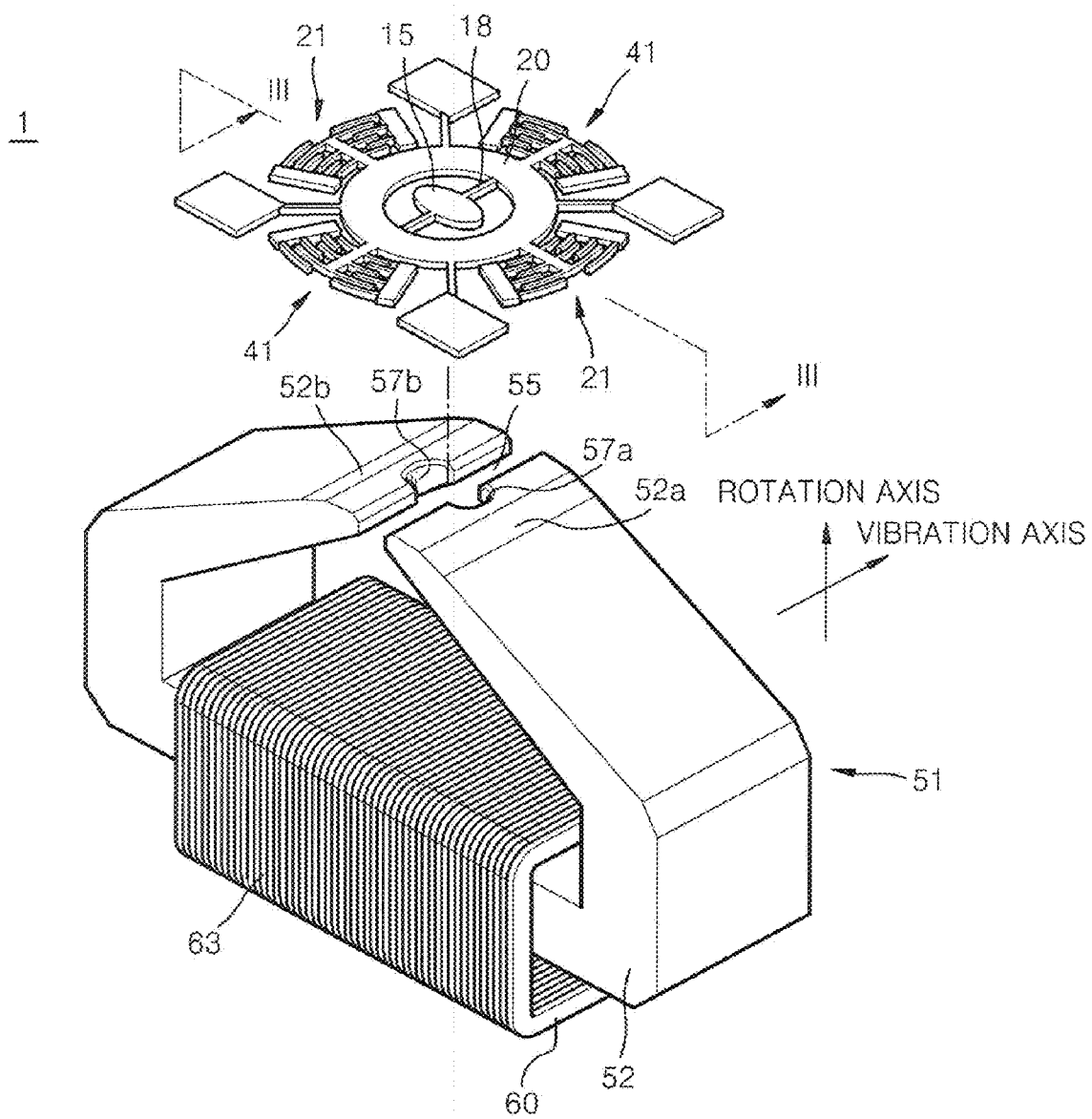
FIG. 1 is a perspective view of a scanner according to an embodiment.

Reference will now be made in detail to the embodiment, examples of which are illustrated in the accompanying drawings, wherein like reference numerals refer to like elements throughout. While the embodiments are described with detailed construction and elements to assist in a comprehensive understanding of the various applications and advantages of the embodiments, it should be apparent however that the embodiments may be carried out without those specifically detailed particulars. Also, well-known functions or constructions will not be described in detail so as to avoid obscuring the description with unnecessary detail. It should be also noted that in the drawings, the dimensions of the features are not intended to be to true scale and may be exaggerated for the sake of allowing greater understanding.

FIG. 1 is a perspective view of a scanner 1 according to an embodiment.

The scanner 1 may include a mirror 15 configured to deflect a light beam, a rotational body 20 spaced apart from and surrounding the mirror 15 and a driving unit 21 configured to rotate the rotational body 20. The mirror 15 may be connected to the rotational body 20 via a first bar 18. Thus, the mirror 15 may be interlockedly driven by the operation of the rotational body 20. The first bar 18 may be a torsion bar. The mirror 15 may vibrate with respect to the first bar 18. That is, the first bar 18 may correspond to a vibration axis of the mirror 15.

Figure 2:
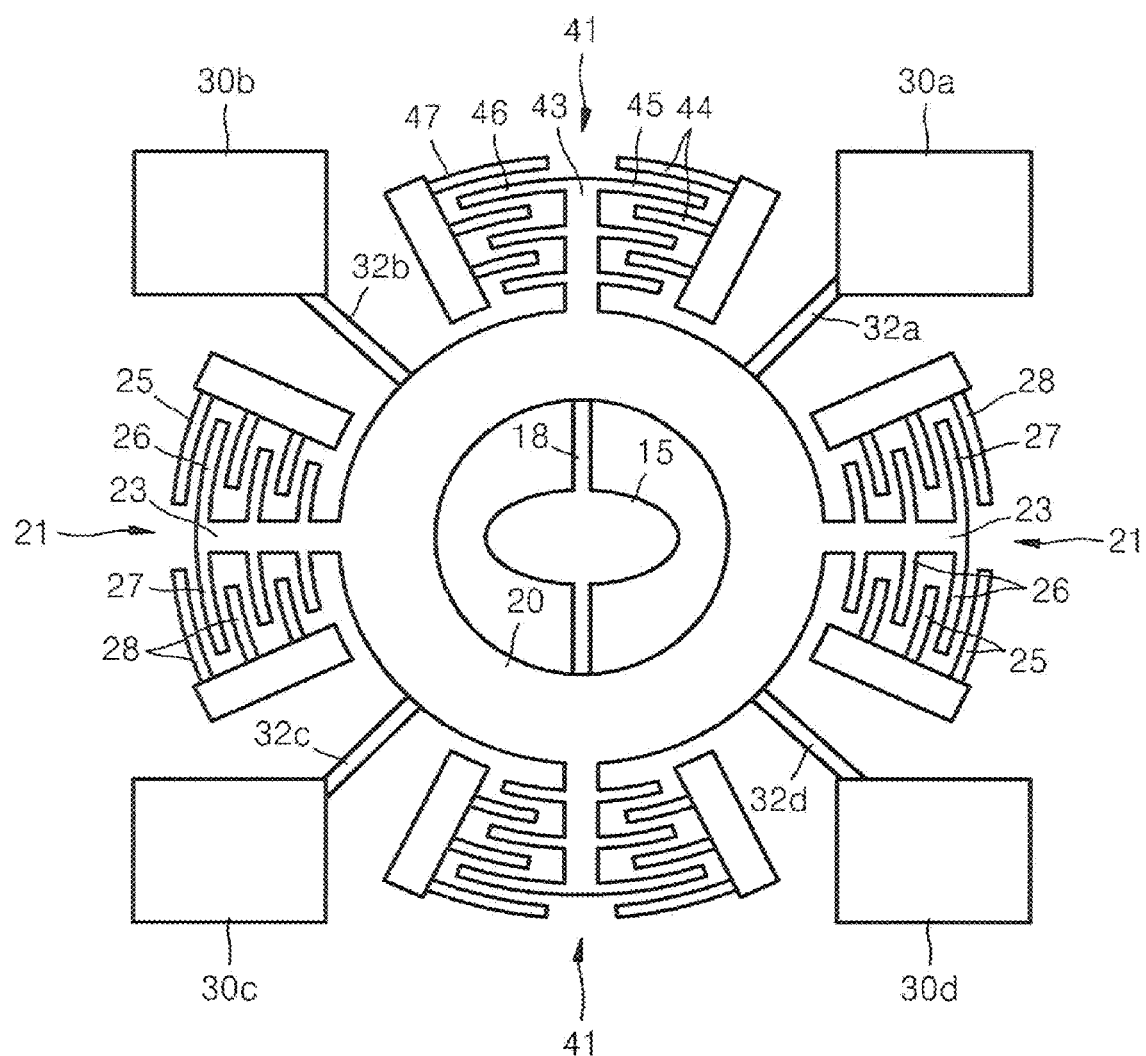
FIG. 2 is a plan view of a scanner according to an embodiment.

The driving unit 21 may rotate the rotational body 20 around an axis perpendicular to the surface of the mirror 15, and may be disposed around the rotational body 20. In this regard, the rotation axis of the rotational body 20 may be perpendicular to a center portion of the mirror 15 when the mirror 15 is in positioned horizontally in a non-vibrating state, for example. The rotation plane of the rotational body 20 may be substantially the same as the plane of the horizontally positioned mirror 15. At least one driving unit 21 may be disposed around the rotational body 20 to rotate the rotational body 20. When more than one driving unit 21 is used, for example to realize a balanced rotation, the driving units 21 may be symmetrically disposed about the rotational body 20. The driving unit 21 may be configured to rotate the rotational body 20 using an electrostatic force, for example. In one embodiment, the driving unit 21 may be a comb driver. Referring to FIG. 2, a first dual comb electrode 23 may extend from the rotational body 20. According to an embodiment, the first dual comb electrode 23 may be integrally formed with the rotational body 20. The mirror 15, the rotational body 20 and the driving unit 21 may be manufactured using a micro electro mechanical system (MEMS) structure. The first dual comb electrode 23 may include comb electrodes 26 and 27 disposed on, and extending from, both sides of the first dual comb electrode 23. The comb electrodes 26 and 27 may include a plurality of electrode fingers. A first comb electrode 25 may be interdigitated with the comb electrode 26 of the first dual comb electrode 23, and a second comb electrode 28 may be interdigitated with the comb electrode 27 of the first dual comb electrode 23.

A plurality of supporting units 30 may be disposed spaced apart from the rotational body 20, and may be connected to the rotational body 20 via second bars 32. The second bar may be a bending bar, for example. According to an embodiment, the a plurality of supporting units 30 may include four supporting units 30a, 30b, 30c and 30d, connected to rotational body 20 respectively via the second bars 32a, 32b, 32c and 32d. The supporting units 30a, 30b, 30c and 30d may be configured to support the rotational body 20, and may define the rotational period of the rotational body 20.

The scanner 1 may further include a detector 41 configured to detect a rotation angle of the rotational body 20. The detector 41 may be made, for example, using a comb electrode capable of measuring an electrostatic capacity or using a piezoelectric material capable of electrically determine a mechanical displacement of the rotational body 20. To detect the rotation angle of the rotational body 20 by measuring the electrostatic capacity, one or more detectors 41 having comb electrodes may be disposed around the rotational body 20. For example, a second dual comb electrode 43 may be disposed at one side of the rotational body 20 to include a comb electrode 45 on one side and another comb electrode 46 on the opposite side. The comb electrodes 45 and 46 may include a plurality of electrode fingers. A third comb electrode 44 may be interdigitated with a comb electrode 45 of the second dual comb electrode 43. Moreover, a fourth comb electrode 47 may be interdigitated with a comb electrode 46 of the second dual comb electrode 43. The rotation angle of the rotational body 20 may be detected by the difference in electrostatic capacity that may occur between the comb electrode 45 of the second dual comb electrode 43 and the third comb electrode 44, and between the comb electrode 46 of the second dual comb electrode 43 and the fourth comb electrode 47. Voltages may be applied to each of the driving unit 21 and the detector 41. According to an embodiment, the driving voltage applied to the driving unit 21 may advantageously be independent of the detection voltage applied to the detector 41 so that one does not affect the other. That is, a detection voltage to detect the electrostatic capacity between the second dual comb electrode 43 and the third comb electrode 44 and between the second dual comb electrode 43 and the fourth comb electrode 47 may be applied to the detector 41 without affecting the application of the driving voltage to the driving unit 21, and thus without effecting the rotation of the rotational body 20.

Figure 3:
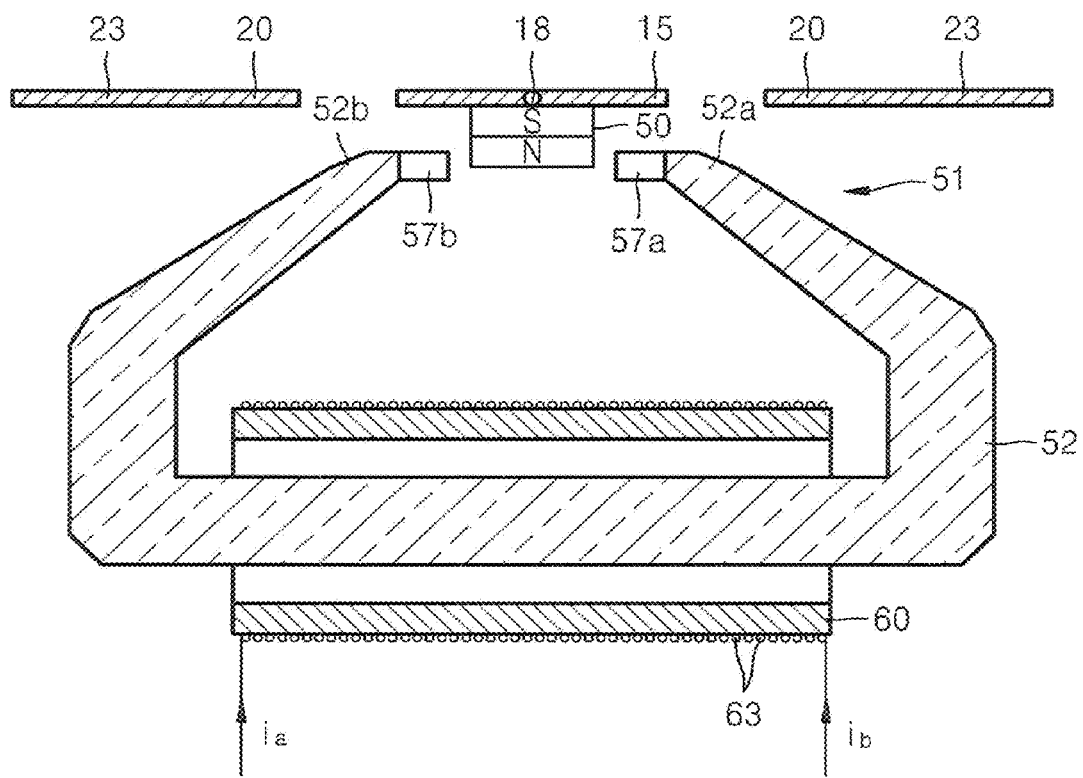
FIG. 3 is an actuator of a scanner according to an embodiment.

As shown in FIG. 1, the scanner 1 may include an actuator 51 disposed below the mirror 15 to cause the minor 15 to vibrate. FIG. 3 is a cross-sectional view of the scanner 1 taken along line of FIG. 1. Referring to FIGS. 1 and 3, the actuator 51 may include a magnet 50 installed on the bottom surface of the mirror 15, a yoke 52 disposed below the magnet 50 and a coil 63 wound around the yoke 52. The yoke 52 may include a first portion 52a and a second portion 52b facing each other with a gap therebetween. The coil may be wound around the center portion of the yoke 52. The first portion 52a and the second portion 52b may correspond to poles, for example, a north pole and a south pole, according to the direction of current flow through the coil 63. The first portion 52a and the second portion 52b may be disposed adjacent to the magnet 50, and may be configured to interact with the magnet 50. As a result, the mirror 15 may be made to vibrate according to such interaction. The first portion 52a and the second portion 52b may have a first groove 57a and a second groove 57b, respectively, which provide a space that allows for the vibration of the minor 15.

Figure 4A:
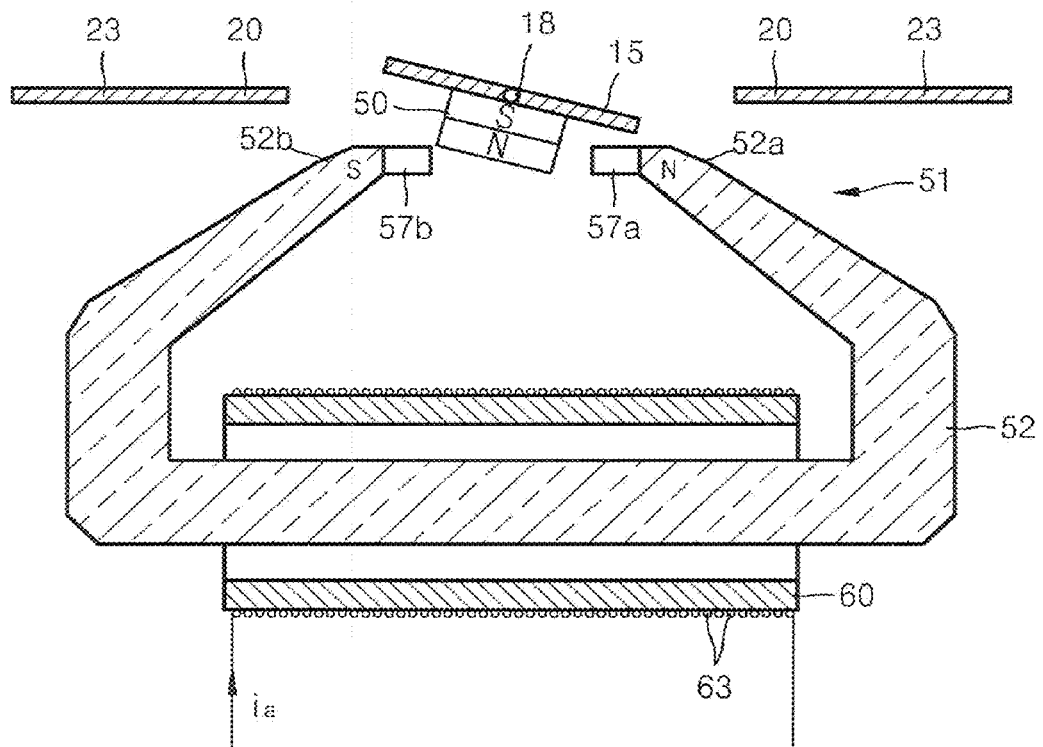
FIGS. 4A and 4B illustrate operation of a mirror of a scanner according to an embodiment.
Figure 4B:
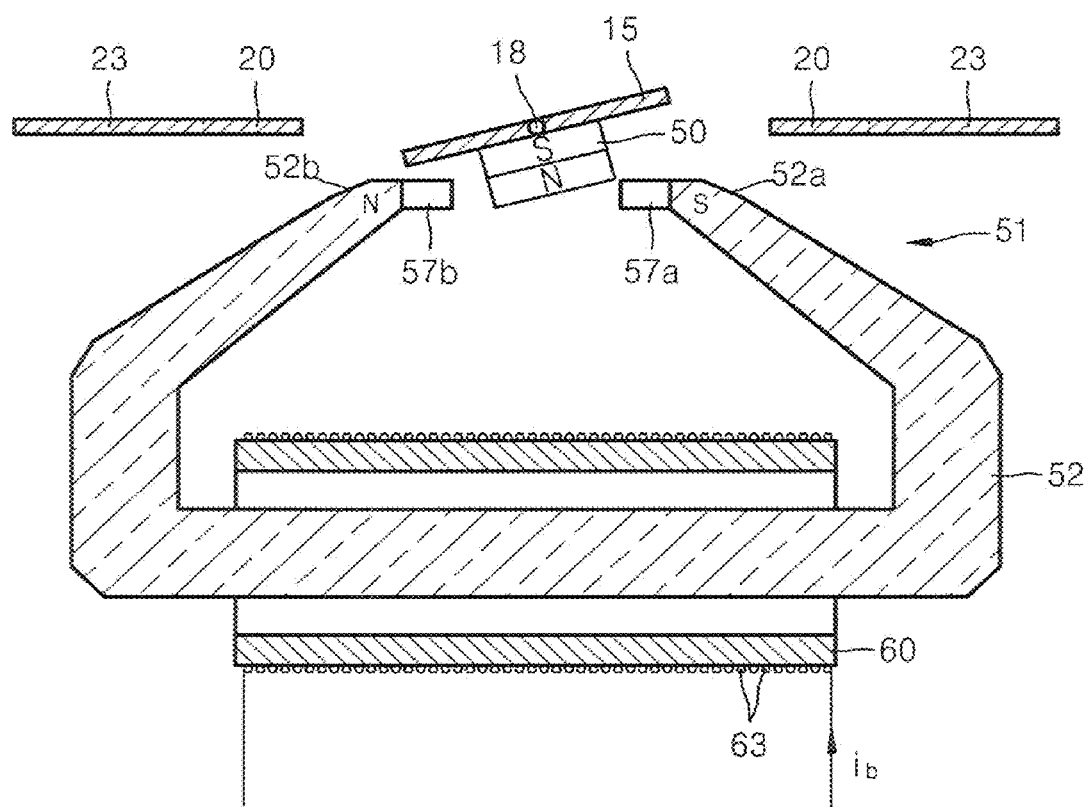

The vibration of the minor 15 will be described with reference to FIGS. 4A and 4B. FIG. 4A illustrates an operation of the minor 15 when a current flows through the coil 63 in a first direction, $i_a$. When the current is supplied to the coil 63 in the $i_a$ direction, an electromagnetic force is generated in the yoke 52 that induces the first portion 52a of the yoke 52 to behave as a north pole and the second portion 52b of the yoke 52 to behave as a south pole. When the magnet 50 is configured such that an upper portion of the magnet 50 behaves as a south pole and a lower portion of the magnet 50 behaves as a north pole, the mirror 15 rotates about the first bar 18 in a clockwise direction because of the repulsion that occurs between the first portion 52a of the yoke 52 and the north pole of the magnet 50 and the attraction that occurs between the second portion 52b of the yoke 52 and the north pole of the magnet 50. Referring to FIG. 4B, when a current flows through the coil 63 in a second direction, $i_b$, opposite to the first direction, the first portion 52a may be induced to behave as a south pole and the second portion 52b may be induced to behave as a north pole. Thus, the mirror 15 rotates in a counterclockwise direction because of the attraction that occurs between the first portion 52a of the yoke 52 and the magnet 50 and the repulsion that occurs between the second portion 52b of the yoke 52 and the magnet 50.

Figure 5:
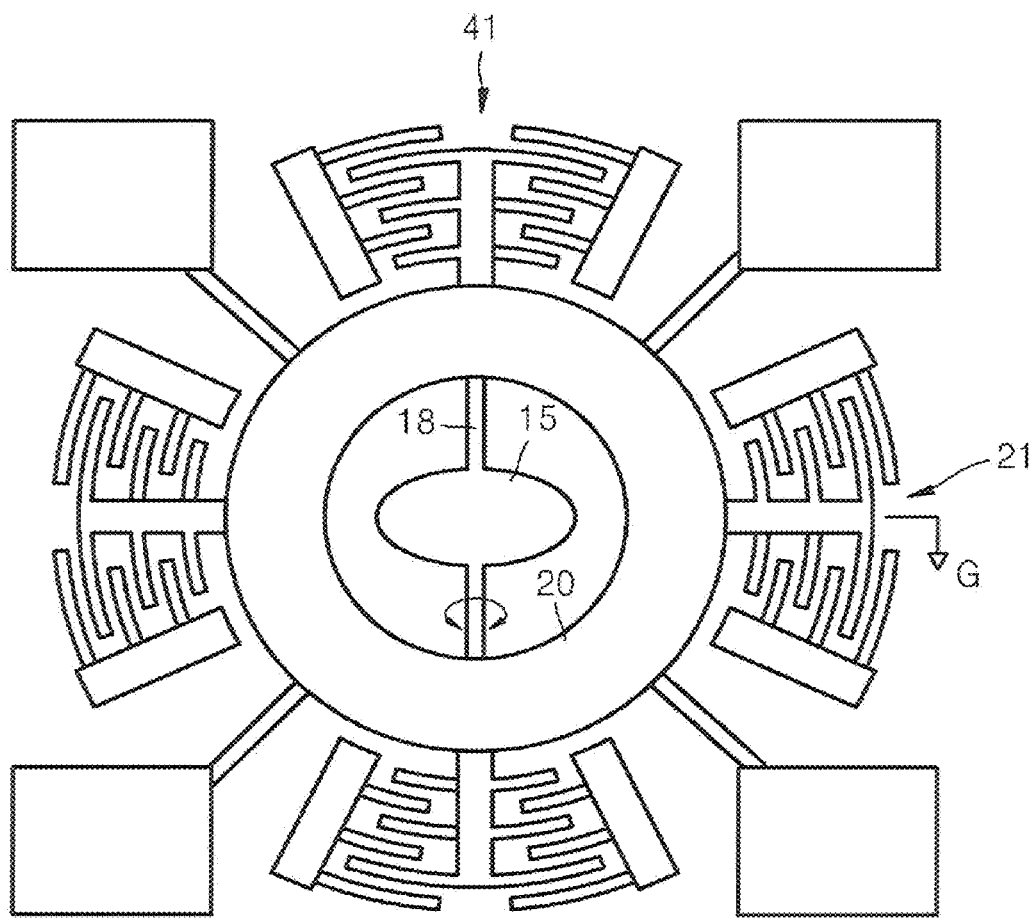
FIG. 5 illustrates a scan line when a rotation body of a scanner according to an embodiment is not driven.
Figure 5:
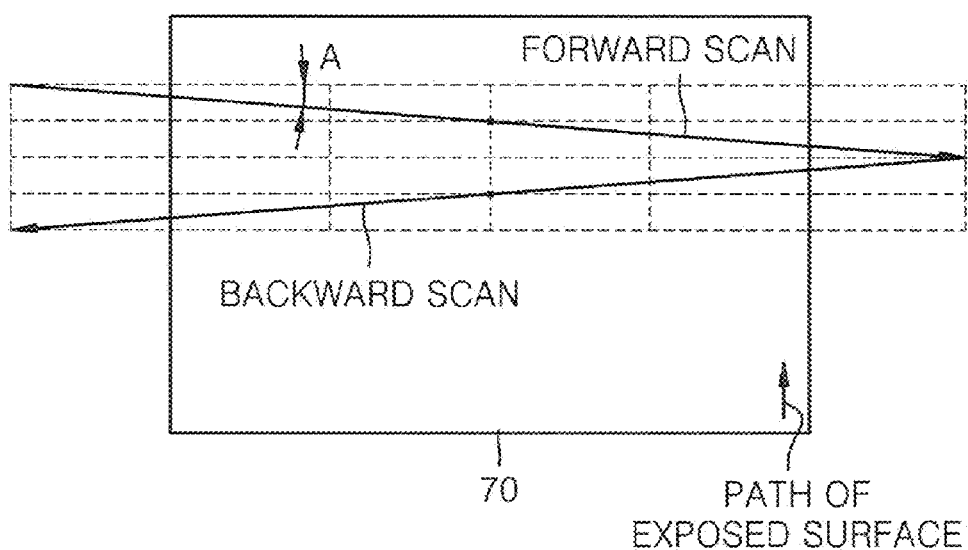

Scanning may be performed by having a beam be incident on the mirror 15 and be reflected from the mirror 15 when the mirror 15 vibrates as described above. FIG. 5 illustrates a bidirectional scanning operation that may be performed using the vibration of the mirror 15. Referring to FIG. 5, forward and backward scanning across a surface of the object to be scanned, herein referred to as an exposed surface 70, may be performed when the mirror 15 vibrates with the rotational body 20 not rotating. The forward and backward scanning may be performed continuously while the exposed surface 70 moves in a sub-scanning direction along the path as indicated by the arrow in FIG. 5. Because the exposed surface 70 keeps moving while the scanning is performed, skewing (i.e., inclination) of scanning lines may result. Moreover, because the skew generated during a forward scanning is formed in a direction opposite to the skew generated during a backward scanning in the bidirectional scanning, the amount of skew may be relatively higher than that may be generated in unidirectional scanning. To compensate for the skew, according to an embodiment, the rotational body 20 may be made to rotate so as to turn the reflection surface of the mirror 15.

Figure 6A:
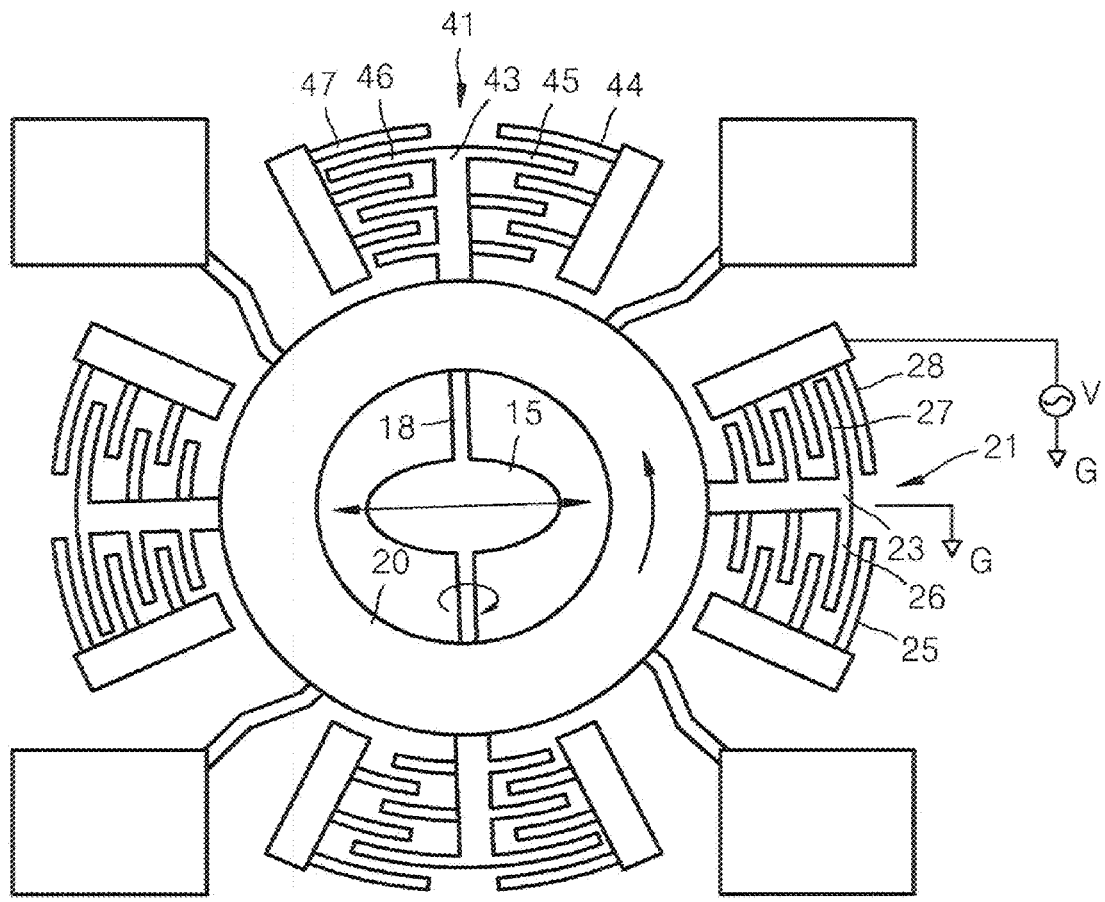
FIGS. 6A and 6B illustrate adjustment of skew of a scan line when a rotation body of a scanner according to an embodiment is driven.
Figure 6A:
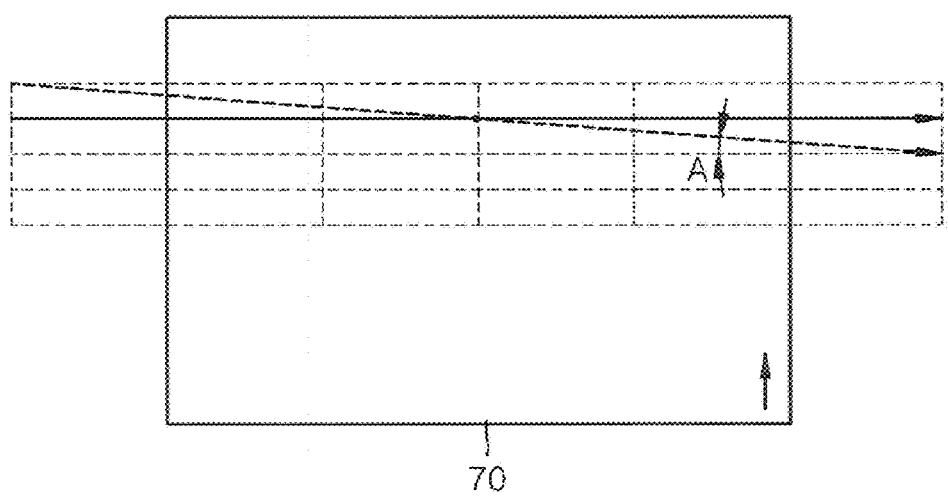

FIG. 6A illustrates a skew adjustment during the forward scanning according to an embodiment. The rotational body 20 may rotate in the counterclockwise direction by an electrostatic force generated between the second comb electrode 28 and the comb electrode 27 of a first dual comb electrode 23 by applying a voltage between the second comb electrode 28 and the first dual comb electrode 23 of the driving unit 21. When the rotational body 20 rotates, the mirror 15 also rotates with the rotational body 20. As a result, the mirror 15 rotates in the counterclockwise direction, resulting in a change in the position of the first bar 18, which corresponds to the vibration axis of the mirror 15. The mirror 15 may start to vibrate or oscillate after the position of the vibration axis of the mirror 15 (i.e., the first bar 18) is changed. As a result, the scanning line of a beam reflected from the mirror 15 may be inclined according to the inclination or the rotational angle of the first bar 18. Because the exposed surface 70 moves in the opposite direction to the inclination of the scanning line that was introduced by the skew adjustment, the resulting scanning line formed on the exposed surface 70 may be adjusted to be without a skew. For example, the dotted arrowed line of FIG. 6A shows that a scanning line is inclined when the scanning is performed while the vibration axis of the mirror 15 moves while the exposed surface 70 does not. The solid line of FIG. 6A shows the adjusted scanning line that results when the exposed surface 70 also moves. That is, the vibration axis of the mirror 15 may be rotated by a certain angle, for example, about a center axis normal to the surface of horizontally positioned mirror 15, so as to introduce the incline in the scanning line to account for the movement of the exposed surface 70, resulting in the skew adjusted scanning line across the moving exposed surface 70 when the mirror 15 vibrates.

Figure 6B:
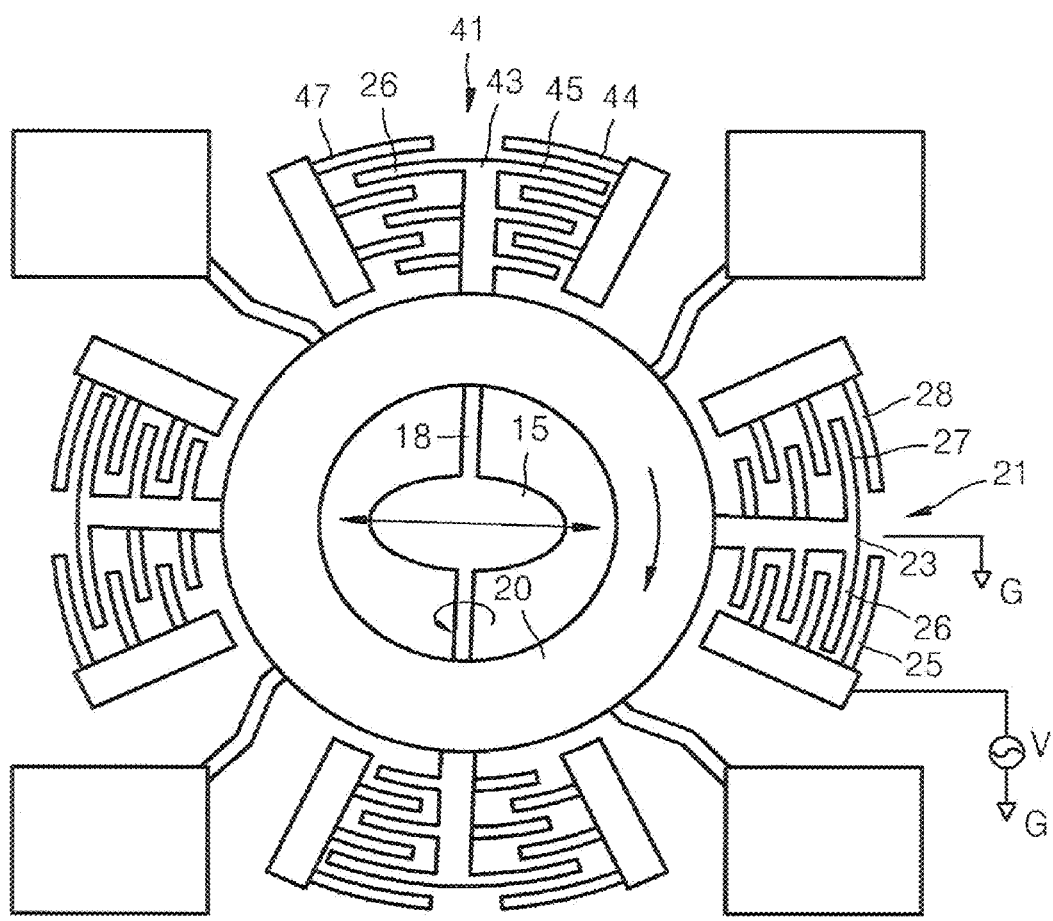
Figure 6B:
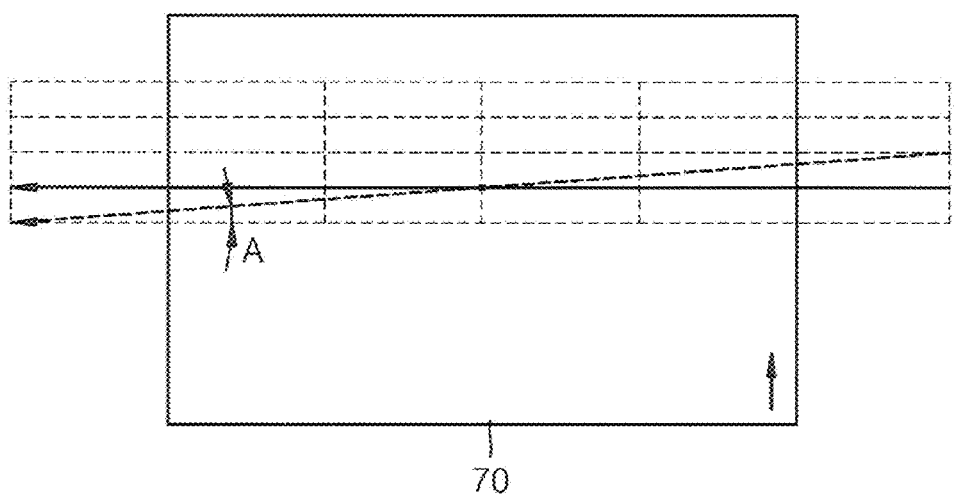

FIG. 6B illustrates adjustment of a scanning line during the backward scanning according to an embodiment. When the rotational body 20 rotates in the clockwise direction, the vibration axis of the mirror 15 rotates with the rotational body 20. When the vibration axis of the mirror 15 is rotated, the scanning line formed by the vibrating mirror 15 becomes inclined. When the exposed surface 70 moves while the backward scanning is performed, the skew of the backward scanning line which would have been caused by the movement of the exposed surface 70 may be adjusted by the incline in the scanning line introduced by the rotation of the vibration axis of the mirror 15. That is, counter-skewing of the scanning line may be introduced prior to the initiation of the scanning, and, during the scanning, such counter-skewing counteracts the movement of the exposed surface 70 so that the scanning line on the exposed surface 70 may be adjusted to be substantially without a skew. The rotational angle A of the rotational body 20 may be determined based on the length of the scanning line resulting from the vibration of the mirror 15 and the interval between scanning lines according to the desired resolution in the sub-scanning direction. Moreover, the changing of the direction of the rotation of the rotational body 20, e.g., from clockwise direction to counter-clockwise direction, may be based on the rotation angle of the rotational body 20 as detected by the detector 41.

When the rotational body 20 rotates, the areas of the detector 41, in which the second dual comb electrode 43 faces or couples with the third comb electrode 44, and in which the second dual comb electrode 43 faces or couples with the fourth comb electrode 47, may be used to measure the rotation angle of the rotational body 20 by sensing an electrostatic capacity associated with those areas.

The scanner according to an embodiment of the present disclosure may be used in an image forming apparatus, in a display device, or in other like device. For example, when the scanner is used in an image forming apparatus, the scanning angle with respect to the main-scanning direction may be determined on the basis of the vibration frequency of the mirror 15, and the speed of the photosensitive medium, onto the surface of which the light is to be scanned, may be known based on the desired printing speed. The rotational angle A of the rotational body 20 may be calculated by considering the speed of the photosensitive medium, the vibration frequency of the mirror 15, the desired resolution in the sub-scanning direction and the scanning angle with respect to the main scanning direction. A driving voltage to be applied to the comb electrodes may in turn be determined based on the rotational angle A. The vibration of the mirror 15 may be synchronized or coordinated with the rotation of the rotational body 20. That is, the period and the phase of the vibration of the mirror 15 may be synchronized in relation to, for example, the period and the phase of the rotation of the rotational body 20. In some embodiments, the rotational frequency of the rotational body 20 may be the same as the vibration frequency of the mirror 15.

Figure 7:
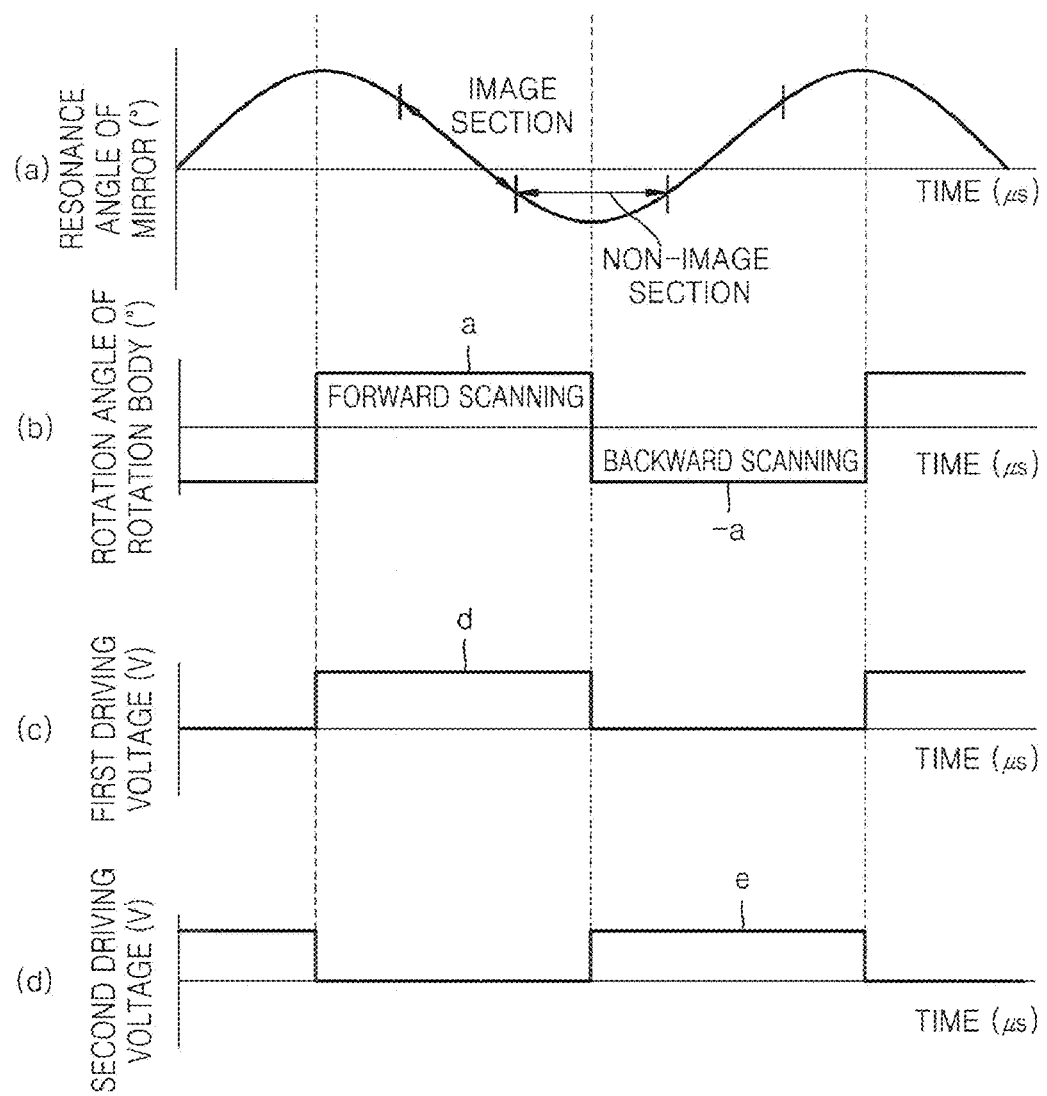
FIG. 7 illustrates a sinusoidal vibration of a mirror of a scanner according to an embodiment (*a*), a square wave rotation of a rotation body of a scanner according to an embodiment (*b*) and a driving voltage to drive a rotation body of a scanner according to an embodiment ((*c*) and (*d*))

FIG. 7 illustrates a synchronization of the vibration of the mirror 15 with the rotation of the rotational body 20 according to an embodiment. FIG. 7(a) illustrates the changes in the vibration or resonance angle of the mirror 15 with respect to time. As shown, the mirror 15 can vibrate in a sinusoidal pattern. An image section can be associated with a portion of the sinusoidal pattern between a peak and a valley of the sinusoidal pattern. A non-image section can be associated with a portion of the sinusoidal pattern at a peak or at a valley of the sinusoidal pattern. FIG. 7(b) illustrates the changes in the rotation angle of the rotational body 20 with respect to time. As shown, the rotational body 20 may be made to rotate in clockwise and counterclockwise directions in a square wave pattern. For example, the rotational body 20 rotates by an angle "a" before a forward scanning line is scanned, and rotates in the opposite direction, i.e., by an angle "−a" before the scanning of a backward scanning line. As shown in FIG. 7(c), a first driving voltage "d" can be applied to the first comb electrode 25 to rotate the rotational body 20 by the first angle "a" prior to the scanning of a forward scanning line. When the forward scanning is completed, the rotational body 20 can rotate in the opposite direction (i.e., by an angle "−a") before an image signal for the backward scanning line is input to the next image section. As shown in FIG. 7(d), a second driving voltage "e" can be applied to the second comb electrode 28 to rotate the rotational body 20 by the angle "−a." According to an embodiment, the rotational body 20 can be driven by the application of voltage, such as, for example, in a square wave pattern described above with respect to FIGS. 7(c) and 7(d), to compensate for the skewing of the scanning line, and thus the skewing can be controlled. That is, according to an embodiment, the skewing of the scanning lines can be adjusted by rotating the rotational body 20 by a certain angle during the non-image section, and allowing the mirror 15 to vibrate during the image sections with the rotational body 20 remaining in such orientation set during the non-image section.

Figure 8:
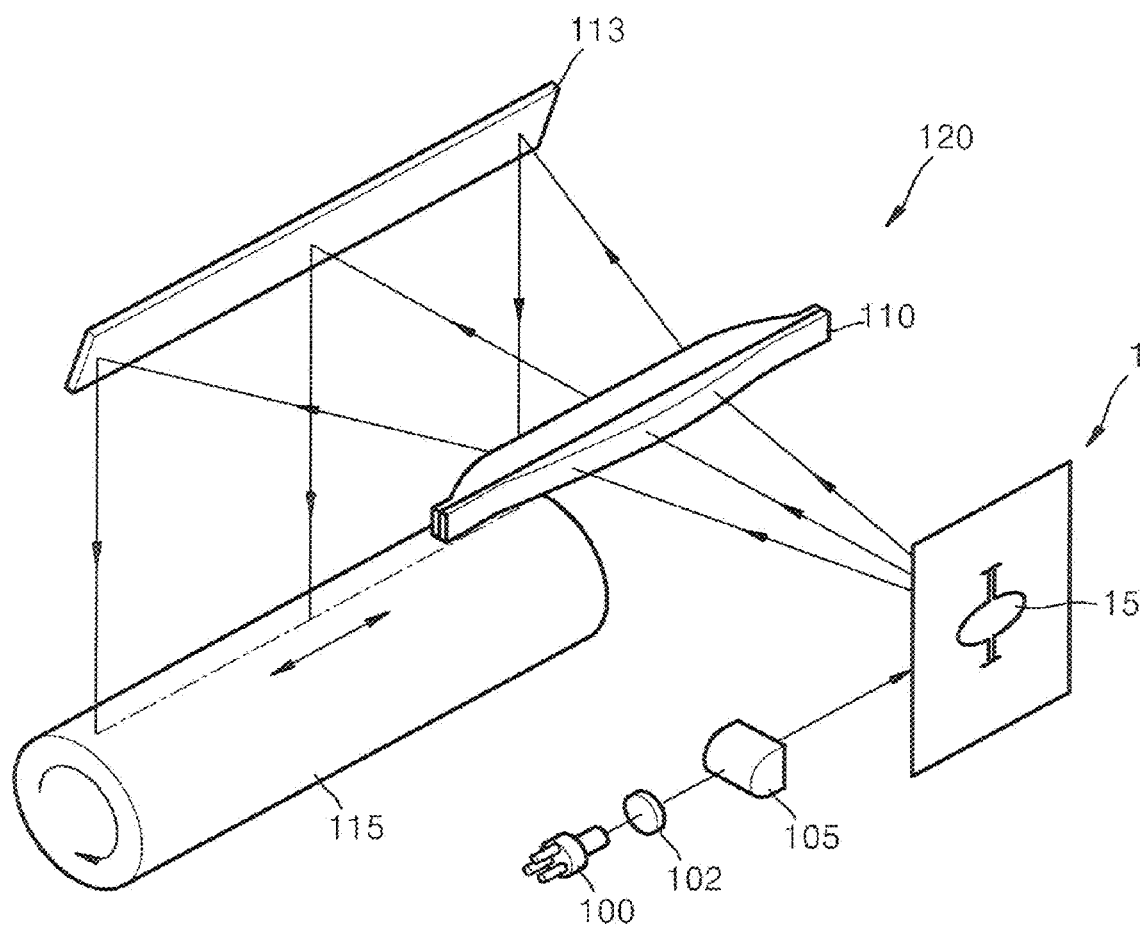
FIG. 8 schematically illustrates an optical scanning apparatus including a scanner according to an embodiment.

FIG. 8 schematically illustrates an optical scanning apparatus 120 including the scanner 1 according to an embodiment. The optical scanning apparatus 120 may include a light source 100 and a scanner 1 that scans a light beam radiated by the light source 100 to a photosensitive medium 115. The scanner 1 may be substantially similar to the scanner according to the embodiments described above, and thus need not be repeatedly described. The optical scanning apparatus 120 may further include a collimating lens 102 configured to collimate the beam of light emitted from the light source 100. The collimating lens 102 may be disposed in the optical path between the light source 100 and the scanner 1. The optical scanning apparatus 120 may also include a cylindrical lens configured to concentrate or focus the light beam onto the mirror 15 of the scanner 1.

An imaging optical device 110 configured to image the beam deflected by the scanner 1 on the photosensitive medium 115 may be disposed in the optical path between the scanner 1 and the photosensitive medium 115. The imaging optical device 110 may include a compensating lens configured to correct the deflected light beam in an arc-sinusoidal pattern so that the light beam deflected by the scanner 1 may be scanned on an exposed surface of the photosensitive medium 115 at regular intervals. An optical path converter 113 may be used with the optical scanning apparatus 120 and may be configured to convert or modify a path of the beam that passed through the imaging optical device 110. The optical path converter 113 may be used to define the optical path in a manner that makes the installation of the optical scanning apparatus 120 more efficient and/or that allows a reduction in the size of the optical scanning apparatus 120.

Figure 9:
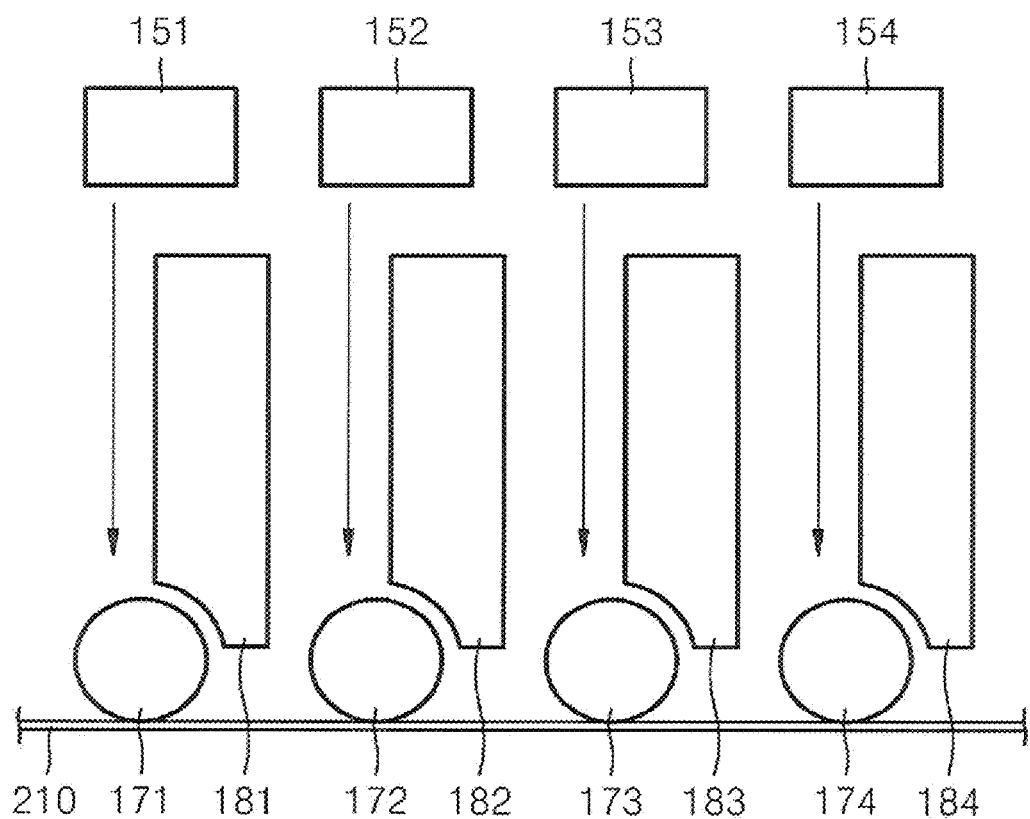
FIG. 9 schematically illustrates an image forming apparatus including a scanner according to an embodiment.

FIG. 9 schematically illustrates an image forming apparatus, according to an embodiment, that may include optical scanning apparatuses 151, 152, 153 and 154 to form color images. The optical scanning apparatuses 151, 152, 153 and 154 may have a structure substantially similar to that of the optical scanning apparatus 120 described above with respect to FIG. 8, and thus need not be described again.

The image forming apparatus may include a first photosensitive medium 171, a second photosensitive medium 172, a third photosensitive medium 173 and a fourth photosensitive medium 174. The image forming apparatus may also include a first optical scanning apparatus 151, a second optical scanning apparatus 152, a third optical scanning apparatus 153 and a fourth optical scanning apparatus 154, which are arranged to scan light to the first to fourth photosensitive media 171, 172, 173 and 174, respectively. The image forming apparatus may further include a developing unit configured to develop an electrostatic latent image formed on each of the photosensitive media and a transfer unit 210 configured to receive the developed images from the photosensitive media. The first to fourth optical scanning apparatuses 151, 152, 153 and 154 may be configured to control the light beam in an ON-OFF manner so as to the light beam is modulated according to an image signal. The light beams from the first to fourth optical scanning apparatuses 151, 152, 153 and 154 may be scanned via the scanner 1 according to one or more embodiments described herein (see, e.g., FIG. 1) to the first to fourth photosensitive media 171, 172, 173 and 174, respectively, to form electrostatic latent images thereon. The developing unit may include a first developing unit 181, a second developing unit 182, a third developing unit 183 and a fourth developing units 184 that correspond to the first to fourth photosensitive media 171, 172, 173 and 174, respectively.

Each of the first to fourth developing units 181, 182, 183 and 184 may be configured to supply developing agent, such as, for example, toner, to the corresponding photosensitive medium to develop the electrostatic latent image into a developed image of a particular monochromatic color. Each of the developed monochromatic images may be sequentially transferred to the transfer unit 210 overlapping one another to form a color image. By way of an example, according to an embodiment, a first line of image transferred from the first photosensitive medium 171 to the transfer unit 210, a second line of image transferred from the second photosensitive medium 172, a third line of image transferred from the third photosensitive medium 173 and a fourth line of image transferred from the fourth photosensitive medium 174 may be sequentially overlapped to form a line of color image. The color image transferred to the transfer unit 210 in such a manner is transferred and fixed on a printing medium such as, for example, a sheet of paper. The general operation of an image forming apparatus that uses optical scanning is well known in the art. A scanner 1 according to embodiments and aspects of the present disclosure may also be used in other image forming apparatuses in addition to the image forming apparatus described with respect to FIG. 9 or in any other devices employing optical scanning.

The scanner 1 according to embodiments herein described may be used in electro-photographic type image forming apparatuses that form images on printing medium, such as, for example, photocopiers, printers, facsimiles, and the like. Moreover, the scanner 1 may also be used in display devices that display images by, for example, scanning light on a screen.

According to an aspect of the present disclosure, the scanner described above with respect to several embodiments may be employed to realize improved scanning speed by enabling a bidirectional scanning. The image quality of the scanner may also be improved by reducing skew of a scanning line caused during forward scanning and backward scanning. In addition, a reduction in noise is also possible as the scanning mirror is driven by an electrostatic force rather than a spindle motor.

While the disclosure has been particularly shown and described with reference to several embodiments thereof with particular details, it will be apparent to one of ordinary skill in the art that various changes may be made to these embodiments without departing from the principles and spirit of the invention, the scope of which is defined in the following claims and their equivalents.

What is claimed is:

1. A scanner, comprising:
a mirror having a reflective surface;
a rotational body spaced apart from and surrounding the mirror;
a first bar connecting the mirror and the rotational body; and
a driving unit configured to rotate the rotational body around an axis perpendicular to reflective surface of the mirror,
wherein the mirror is configured to vibrate about the first bar in synchronization with the rotation of the rotation body and scanning is performed using the vibration of the mirror, and
the rotation of the mirror reduces skew of a scanning line caused during scanning.

2. The scanner of claim 1, wherein the driving unit is configured to produce an electrostatic force that cause the rotational body to rotate.

3. The scanner of claim 1, wherein the driving unit is configured to rotate the rotational body by a first rotational angle in a first direction from an initial reference position prior to initiating a forward scanning by the scanner.

4. The scanner of claim 3, wherein the driving unit is configured to rotate the rotational body in a second direction opposite to the first direction such that the rotational body is rotated from the initial reference position by a negative of the first rotational angle prior to initiating a backward scanning by the scanner.

5. The scanner of claim 1, wherein the driving unit is configured to drive the rotational body to rotate bidirectionally in a reciprocating manner within a range of rotational angles.

6. The scanner of claim 1, wherein the first bar includes a torsion bar.

7. The scanner of claim 1, further comprising:
one or more supporting members fixedly disposed to be spaced apart from the rotational body; and
one or more second bars connecting the rotational body and the supporting unit.

8. The scanner of claim 7, wherein each of the one or more second bars is bendable.

9. The scanner of claim 1, wherein the driving unit includes a comb driver.

10. The scanner of claim 9, wherein the driving unit comprises:
a comb electrode extending from the rotational body;
a first group of electrode fingers extending from a first side of the comb electrode; and
a second group of electrode fingers extending from a second side opposite the first side of the comb electrode.

11. The scanner of claim 1, further comprising:
a detector configured to detect a rotation angle of the rotational body.

12. The scanner of claim 11, wherein the detector comprises:
a comb electrode extending from the rotational body;
a first group of electrode fingers extending from a first side of the comb electrode; and
a second group of electrode fingers extending from a second side opposite the first side of the comb electrode.

13. The scanner of claim 1, further comprising:
a magnet disposed on a surface opposite the reflective surface of the mirror;
a yoke disposed adjacent the magnet, the yoke including a first portion and a second portion collectively configured to magnetically interact with the magnet; and
a coil wound around the yoke.

14. An image forming apparatus, comprising:
a light source configured to produce a light beam;
a scanner configured to receive the light beam from the light source and to deflect the received light beam across a scanning line;
a photosensitive medium having a photosensitive surface upon which the light beam deflected by the scanner is incident to thereby form on the photosensitive surface an electrostatic latent image;
a developing unit arranged adjacent the photosensitive member, the developing unit configured to apply developing agent to the photosensitive surface so as to develop the electrostatic latent image into a visible image;
and a transfer unit configured to transfer the visible image onto a printing medium, wherein the scanner comprises:
a mirror having a reflective surface; a rotational body spaced apart from and surrounding the mirror, the rotational body being configured to rotate about a rotational axis substantially perpendicular to the reflective surface of the mirror;
a first bar connecting the mirror to the rotational body such that the mirror rotates together with the rotational body about the rotational axis; and
a driving unit configured to drive the rotational body to rotate about the rotational axis,
wherein the mirror is configured to vibrate about the first bar in synchronization with the rotation of the rotation body and scanning is performed using the vibration of the mirror, and
the rotation of the mirror reduces skew of a scanning line caused during scanning.

15. The image forming apparatus of claim 14, wherein the driving unit of the scanner includes a comb driver.

16. The image forming apparatus of claim 15, wherein the driving unit of the scanner comprises:
a comb electrode extending from the rotational body of the scanner;
a first group of electrode fingers extending from a first side the comb electrode;
and a second group of electrode fingers extending from a second side opposite the first side of the comb electrode.

17. The image forming apparatus of claim 14, further comprising:
an optical device configured to image the light beam scanned by the scanner onto the photosensitive medium.

18. The image forming apparatus of claim 17, wherein the optical device is configured to perform an arcsinusoidal correction on the light beam scanned by the scanner so that the light beam is scanned at regular intervals on the photosensitive surface of the photosensitive medium.

19. A light scanning apparatus, comprising:
a light source configured to generate light; and
a mirror having a reflective surface upon which the light generated by the light source is incident, the mirror being configured to oscillate about a first axis substantially parallel to the reflective surface, the mirror being further configured to be rotatable about a second axis substantially perpendicular to the first axis and the reflective surface,
wherein the mirror is configured to vibrate about the first bar in synchronization with the rotation of the rotation body and scanning is performed using the vibration of the mirror, and
the rotation of the mirror reduces skew of a scanning line caused during scanning.

20. The light scanning apparatus of claim 19, further comprising:
a rotational body spaced apart from and surrounding the mirror, the rotational body being configured to rotate about the second axis;
a bar member extending substantially parallel to the first axis, the bar member connecting the mirror to the rotational body such that the mirror rotates together with the rotational body about the second axis; and
a comb electrode structure having one or more first electrode fingers coupled to the rotational body and one or more second electrode fingers in interdigitated arrangement with respect to the one or more first electrode fingers such that when a driving voltage is applied between the one or more first electrode fingers and the one or more second electrode fingers, an electromagnetic force acting between the one or more first electrode fingers and the one or more second electrode fingers causes the rotational body to rotate.

21. The light scanning apparatus of claim 19, further comprising:
a magnet coupled to the mirror; a magnetic flux device arranged adjacent the magnet, the magnetic flux device being configured to generate magnetic force in switching polarity such that the magnetic force acting upon the magnet causes the mirror to oscillate about the first axis.

22. The light scanning apparatus of claim 19, wherein the mirror oscillates about the first axis so as to cause the light incident upon the reflective surface thereof to be deflected across a substantially linear scanned path, and wherein a first scanned path of the light deflected by the mirror when the mirror is rotated about the second axis to a first rotational position forms an angle with a second scanned path of the light deflected by the mirror when the mirror is rotated about the second axis to a second rotational position different from the first rotational position.

23. The light scanning apparatus of claim 22, wherein the light scanning apparatus is configured to sequentially perform a first rotation of the mirror about the second axis in a first rotational direction, an oscillation of the mirror about the first axis and a second rotation of the mirror about the second axis in a second rotational direction opposite to the first rotational direction.

24. The light scanning apparatus of claim 20, further comprising:
a rotational angle detector having one or more third electrode fingers coupled to the rotational body and one or more fourth electrode fingers in interdigitated arrangement with respect to the one or more third electrode fingers such that when a detection voltage is applied between the one or more third electrode fingers and the one or more fourth electrode fingers, an electrostatic capacitance between the one or more third electrode fingers and the one or more fourth electrode fingers varies according to a distance by which the one or more third electrode fingers are spaced apart from the one or more fourth electrode fingers, wherein the driving voltage and the detection voltage are applied independently of each other.

* * * * *

UNITED STATES PATENT AND TRADEMARK OFFICE
CERTIFICATE OF CORRECTION

PATENT NO. : 8,254,007 B2  
APPLICATION NO. : 12/567179  
DATED : August 28, 2012  
INVENTOR(S) : Se-Tae Kim Page 1 of 1

It is certified that error appears in the above-identified patent and that said Letters Patent is hereby corrected as shown below:

Title Page, Column 1 (Assignee); Line 1; Delete "Electroncis" and insert -- Electronics --, therefor.

In the Claims:

Column 10; Line 27; In Claim 1, Delete "rotation" and insert -- rotational --, therefor.
Column 11; Line 46; In Claim 14, Delete "rotation" and insert -- rotational --, therefor.
Column 11; Line 58; In Claim 16, Before the "the" insert -- of --.
Column 12; Line 13; In Claim 19, Delete "rotation" and insert -- rotational --, therefor.

Signed and Sealed this
Fourteenth Day of May, 2013

Teresa Stanek Rea
*Acting Director of the United States Patent and Trademark Office*